Nov. 23, 1926.
R. F. REEVE
1,608,234
TIRE BLOW-OUT PATCH
Filed Nov. 24, 1925
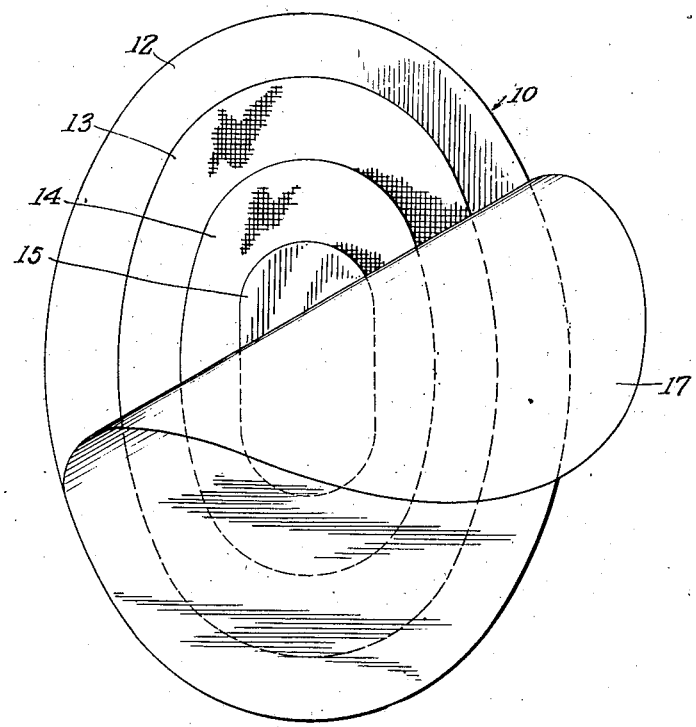
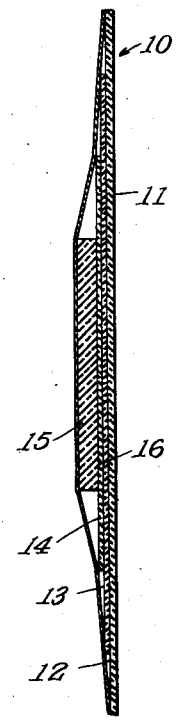
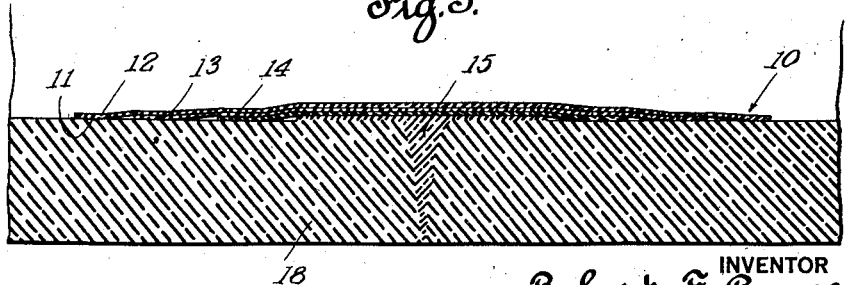
INVENTOR
Robert F. Reeve
BY
Fredk C Fischer
ATTORNEY Patented Nov. 23, 1926.

1,608,234

UNITED STATES PATENT OFFICE.

ROBERT F. REEVE, OF NEWARK, NEW JERSEY.

TIRE BLOW-OUT PATCH.

Application filed December 24, 1925. Serial No. 77,502.

This invention relates to tire blow-out patches and has as one of its objects to provide a patch that will confine the gum within its marginal limits and prevent the same from spreading over the outer surface of the inner tube.

In practice, it has been found that tire blowout patches of this type adhere to the outer surface of the inner tube, due to the spreading or oozing out of the gum from the patch, often resulting in destroying the inner tube beyond repair.

One object of the present invention is to avoid the spreading or oozing out of the gum and to confine the same within the limits of the patch, by providing the inner surface of the layer of the patch which contacts with the inner tube, with a semi-cured surface that will, within a few minutes of its application to the tire, owing to its semi-cured surface, effectually seal the marginal edges of the patch to the tire shoe, positively preventing any of the uncured gum on the intermediate layers of the patch from oozing out onto the periphery of the outermost layer, thereby preventing any of the gum from coming into contact with the inner tube.

Another object is to provide a patch that is easy to apply and will allow the tire to be used within a few minutes after application. The last named characteristic obviates the necessity of waiting for the mended parts to dry or delays caused by the vulcanization process.

These and other objects are accomplished by the novel construction and arrangement of parts hereinafter described and illustrated in the accompanying drawing, in which:—

Figure 1 is a top plan view of the preferred embodiment of the device, the cover being partially removed to show the construction.
Figure 2 is a longitudinal sectional view of the device with the cover thereon.

Figure 3 is a sectional view thereof, showing an application of the device to a tire shoe.
Referring more in detail to the drawing, the preferred shape, as indicated, is oval as best suited to engage with the tire shoe, and is applied on the inner surface over a puncture, blow-out or like opening.
The device consists of a layer 10 cut from a sheet of substantially pure gum, the back surface 11 of which has been cured, while the front surface 12 has been only partially cured to present a tacky, strongly adhesive face.

Centrally disposed on the face 12 is a layer 13, of lesser area to present a substantially uniform margin therearound and a third layer 14 of decreased area is arranged centrally on the second or intermediate layer 13.

The layers 13 and 14 are preferably made from a sheet of heavy woven textile fabric, as duck or canvas and are secured in relative relation by rubber cement to cause adherence, the lower layer 13 being further confined by the soft tenacious face of the base layer 10.

A block 15 of uncured gum is caused to adhere to the upper layer 14 in a similar manner, this block being much less in area than the layer on which it is superposed and is cut from a sheet previously partially cured on its lower surface 16 to impart a certain degree of stability, the main portion of the block being what is technically known as "five minute" stock.

The block 15 and several layers are pressed together to form a unit, the exposed upper surfaces of which are protected while in storage or transit by a thin muslin cover 17 lightly laid over the sticky surfaces.

The number of layers in the patch may be increased or diminished in accordance with the duty the patch is to perform; obviously a heavy truck tire requiring additional layers.

In operation, the cover 17 is stripped off the patch, the tire removed and the inner tube taken out of the shoe.

The edges of the puncture are cleaned from dirt and also the inner marginal surfaces rendered fairly clean. The patch is applied from within the shoe, with the block 15 directly over the puncture, and pressed firmly in place.

The inner tube is re-inserted and filled as usual with compressed air, forcing the gum to flow into the opening, filling the space and covering its margin, as shown in Figure 3, in which the numeral 18 designates the tire shoe.

Due to the tenacious adherence of the margin 12, flow of the gum block 15 is prevented beyond the contour of the patch, thus avoiding any damage or adherence to the tube.

The canvas layers operate to prevent the patch from being forced too far into the opening, acting as a reenforcement, and, due to the strength of the fibres of which they are composed, prevent tearing or cracking of the patch.

Although the foregoing is descriptive of the preferred embodiment of the invention, it will be apparent that minor changes may be made in its construction, without the exercise of invention or conflicting with the scope of the claims hereto appended.

Having thus described my invention, what I claim as new and desire to secure by Letters Patent, is:—

1. A repair patch comprising a plurality of oval layers progressively decreasing in area, said layers being cemented together, the top layer of said patch being cured on one side and semi-cured on the other to adhere to the surface surrounding the marginal edge of a rupture, said semi-cured side of the top layer of the patch being vulcanizable by heat engendered by use of the tire.

2. A repair patch comprising a plurality of oval layers progressively decreasing in area, said layers being cemented together, a cured gum block on the smallest of said layers, vulcanizable in half the time of the semi-cured surface of the top layer.

3. A repair patch comprising an outer layer of rubber cured on its outer surface and partially cured on its inner surface, layers of canvas progressively decreasing in area cemented to the outer layer, and a block of rubber on the inner layer of canvas and partially cured on its attached surface, said outer layer having an adhesive margin adapted to prevent flowing of said block therebeyond when under pressure.

4. A repair patch comprising a plurality of thin untreated oval canvas sheets, each progressively decreased in area, a backing sheet of larger area than the above mentioned sheets secured to said sheets, the back surface of which has been cured into a sheet of rubber and the front surface of which has been semi-cured, and a layer of relatively pure unvulcanized gum block provided with a semi-cured back surface capable of being vulcanized in approximately five minutes, said block being of lesser area than the smaller of said sheets to which it is applied.

This specification signed and witnessed this 21st day of December, 1925.

ROBERT F. REEVE.